Jan. 5, 1932.  J. M. DORTON  1,839,656
ADJUSTABLE SEAT
Filed Nov. 11, 1929   2 Sheets-Sheet 2
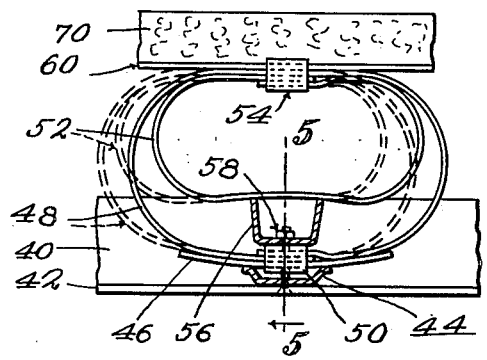
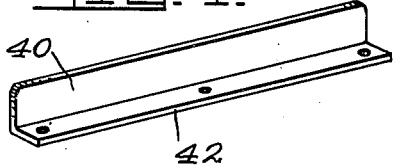
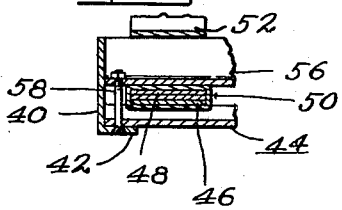
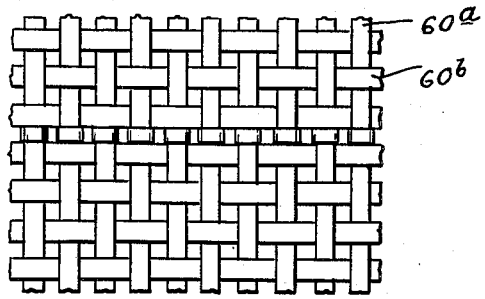
Inventor
John M. Dorton,
By F. G. Fischer,
Attorney.

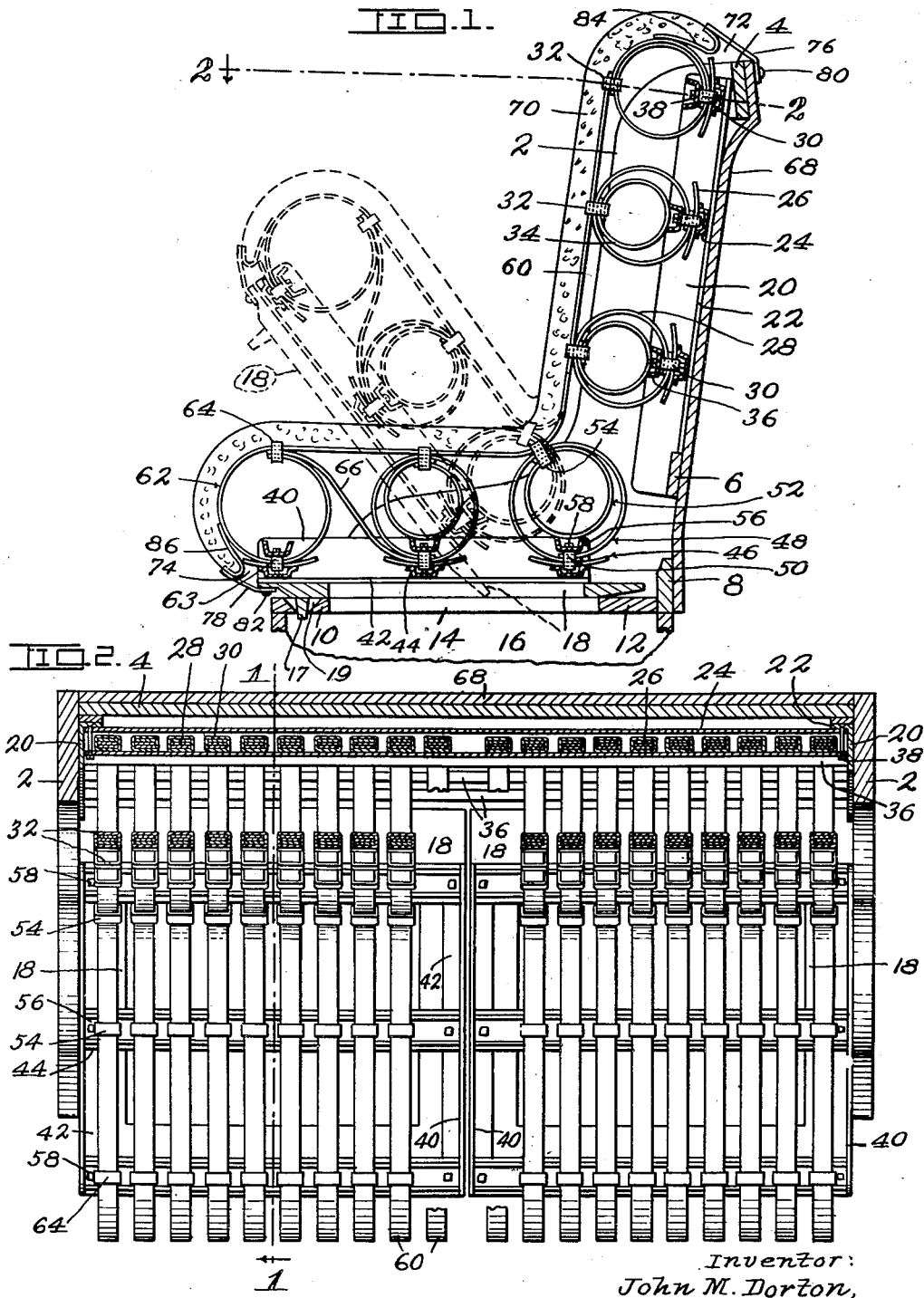

Patented Jan. 5, 1932

1,839,656

UNITED STATES PATENT OFFICE

JOHN M. DORTON, OF BONNER SPRINGS, KANSAS

ADJUSTABLE SEAT

Application filed November 11, 1929. Serial No. 406,346.

My invention relates to adjustable seats which may be employed to advantage for general purposes but are more particularly designed for use in automotive vehicles, and one object is to provide a device of this character in which the cushioning means of the seat and the back portions of the device are so arranged and combined that the upper surface of the seat and the forward portion of the back will move up and down together when the vehicle is traveling over a rough road, and hence will not wrinkle the coat or pull the back of the shirt from the trousers of the occupant as often occurs when the cushioning means of the seat portion moves up and down independently of the back portion.

Another object is to provide cushioning means with snubber means whereby the rebound and vibration of said cushion means, due to the vehicle running over rough roads, will be materially retarded and thereby render the seat more comfortable for the occupant.

A further object is to provide a device of this character which may be opened at its ends for the purpose of ventilation during warm weather and closed during cold weather.

Other objects will hereinafter appear and in order that the invention may be fully understood, reference will now be had to the accompanying drawings, in which:

Fig. 1 is a vertical section of the device on line 1—1 of Fig. 2, with one of the seats raised in dotted lines so that access may be had to a compartment beneath the seats.

Fig. 2 is a horizontal section on line 2—2 of Fig. 1 with the upholstery removed to show important features of the invention.

Fig. 3 is an enlarged broken detail of a part of the seat portion and part of the snubbers therefor, the latter being shown compressed and the operation thereof being partly shown by dotted lines.

Fig. 4 is a detail perspective view of a reinforcing member.

Fig. 5 is a broken cross section on line 5—5 of Fig. 3.

Fig. 6 is a broken elevation of a portion of the upper rear part of the back of the device with an opening for ventilation.

Fig. 7 is a broken detail of a modified form of cushioning means for the device.

In carrying out the invention I employ a frame which may be of any suitable construction. In the present instance I have shown said frame consisting of a pair of side members 2, transverse members 4, 6, 8, 10 and 12, and longitudinal members 14. The transverse members 4, 6 and 8 unite the upper rear portion of the side members 2, while the transverse members 10 and 12 unite the under portion of said side members 2. The transverse members 10 and 12 and the longitudinal members 14 also form the upper portion of a compartment 16 in which tools and other articles may be carried.

18 designates a pair of independent seat frames operably mounted upon the members 10, 12 and 14, so that either of said seat frames may be raised to the dotted line position Fig. 1, when it is desired to gain access to the compartment 16. When in normal position the seat frames 18 are secured against backward or forward movement by a stud 17 projecting into a hole 19 in the transverse member 10 of the frame.

The upwardly extending portions of the side members 2 of the frame are provided with reinforcing members 20 having flanges 22 turned toward each other and united by a plurality of transverse bars 24 upon which rows of short spring leaves 26 are mounted.

28 designates a plurality of main snubber elements consisting preferably of strips of spring metal bent into approximately annular formation and secured at their rear portions to the spring leaves 26 by fastening members 30. The main snubber elements 28 are reinforced by auxiliary snubber elements 34 which consist preferably of the same kind of material forming said main snubber elements 28, within which latter they are arranged in annular formation and secured at their overlapping ends by fastening members 32. The rear portions of the auxiliary snubber elements 34 bear against transverse bars 36 to which the fastening members 30 are spot welded or otherwise suitably secured.

The bars 36 are secured at their ends to the ends of the bars 24 and to the flanges of the reinforcing members 20 by suitable means such as bolts 38.

The independent seat frames 18 are each equipped at two sides with a pair of reinforcing members 40 provided at their lower margins with flanges 42 which are turned towards each other and firmly secured upon said seat frames 18. The flanges 42 of each pair of reinforcing members 40 are united by bars 44 upon which rows of short spring leaves 46 are mounted. Each of the two rows of rearmost spring leaves 46 support main snubber elements 48 held in place by fastening members 50. An auxiliary snubber element 52 is arranged within each main snubber element 48 and secured at its overlapping ends to the main snubber elements 48 by fastening members 54. The snubber elements 48 and 52 consist preferably of the same kind of material and are bent in the same form as the snubber elements 28 and 34.

The auxiliary snubber elements 52 rest in vertical positions upon bars 56 to which the fastening members 50 are secured in any suitable manner. The bars 56 are arranged over the bars 44 and secured to the ends thereof and to the flanges of the reinforcing members 40 by suitable means such as bolts 58.

60 designates a plurality of spaced flexible strips or ribbons consisting preferably of resilient metal and coiled in annular formation at their forward portions 62. The coils 62 are secured upon the foremost spring leaves 46 by fastening members 63 and their upper ends are secured to the main body of the respective ribbons 60 by fastening members 64. The ribbons 60 extend backwardly upon the snubbers 48 to form a seat portion and upwardly in front of the snubbers 28 to form a back portion of the device, and are secured in place by the fastening members 54 and 32. Flexible brace members 66 extend from the upper portions of the coils 62 to the under portions of the foremost snubbers 48 for limiting the backward and forward movements of said coils 62 when subjected to the weight of the occupant of the seat while the vehicle is in motion. The ends of brace members 66 are held in place by the first row of fastening members 50 and the fastening members 64.

The rear portion of the device is closed by a suitable sheet of material 68 secured to the transverse members 4, 6 and 8 while the front and sides of the device are closed by suitable upholstery 70, the ends of which terminate within a short distance of the transverse members 4 and 10 to leave openings 72 and 74, respectively, for the ingress and egress of air during warm weather, the air being drawn in and expelled as the snubber means alternately expand and contract under the weight of the occupant or occupants of the device.

The upholstery 70 is divided over the two adjacent reinforcing members 40 so that the seat portions may be raised to the dotted line position, Fig. 1, when it is desired to gain access to the compartment 16, and the upper and lower ends of said upholstery are held in place by straps 76 and 78 which engage over buttons 80 and 82 secured to the transverse member 4 and the forward portions of the independent seat frames 18, respectively. During cold weather the air openings 72 and 74 may be closed with flaps 84 and 86 adapted to engage over the buttons 80 and 82 after the strips 76 and 78, respectively, have been detached from said buttons.

With the parts arranged as shown and described it is apparent that the ribbons 60 form cushioning means for the seat and the back portion of the device, while the coils 62, the main snubber elements 48 and the auxiliary snubber elements 52 constitute means for preventing undue vibration and rebound of the seat portion of the device, while the snubbers 28 and 34 form means for preventing undue vibration and rebound of the back of the device and thereby prevent undue shock to the occupant. It is also apparent that the seat and back portions of the strips 60 will move up and down together and hence will not pull the shirt from the trousers or cause the coat of the occupant to wrinkle, a common occurrence with the usual type of seat in which the seat and back cushions are not connected and move up and down independently of each other to a certain extent.

When the main snubber elements 28 and 48 are compressed in the manner shown by Fig. 3, they are relieved of such sharp bending stresses as would likely cause crystallization and breakage of the material of which they are formed by the spring leaves 26 and 46, respectively, which present relatively broad surfaces to the back portions of the snubber elements 28 and the under portions of the snubber elements 48, and the bars 36 and 56 are preferably of channel formation in order to provide two bearing surfaces for the auxiliary snubber elements 34 and 52, respectively. Furthermore, said snubber elements 34 and 52 are free to roll to a limited extend on the respective bars, see dotted lines Fig. 3, so that all of the bending stresses will not occur at the same point upon said snubber elements.

In the modified form disclosed by Fig. 7, the ribbons 60a are interwoven with ribbons 60b when it is desired to stiffen the seat portion of the device.

From the foregoing description it is apparent that I have provided a device embodying the advantages above pointed out, and while I have shown and described a preferred embodiment of said device and a modified form of the arrangement of the ribbons, I reserve all rights to such other forms and modifications as properly fall within the spirit and scope of the invention as claimed.

Having thus described my invention, what I claim and desire to secure by Letters Patent, is:

1. A device of the character described consisting of side members, reinforcing members secured to said side members, a plurality of bars secured to said reinforcing members, a plurality of substantially annular snubber elements secured to said bars, a seat frame associated with the side members, reinforcing members secured to said seat frame, a plurality of bars secured to the seat reinforcing members, a plurality of substantially annular snubber elements mounted on the last-mentioned bars, and flexible strips secured to the snubber elements and arranged in the form of seat and back members of the device.

2. A device of the character described consisting of side members, reinforcing members secured to said side members, a plurality of bars secured to said reinforcing members, a plurality of substantially annular snubber elements secured to said bars, individual seat frames associated with the side frames, reinforcing members secured to said seat frames, a plurality of bars secured to the seat reinforcing members, a plurality of substantially annular snubber elements mounted on the last-mentioned bars, and flexible strips secured to the snubber elements and arranged in the form of seat and back members of the device, said flexible strips permitting the seat frames to be raised and lowered.

3. A device of the character described consisting of a suitable frame having seat and back portions, snubber means supported by said frame, flexible strips supported by said snubber means, upholstery arranged upon said flexible strips and extending to within a short distance of the front end of the seat portion and to within a short distance of the upper end of the back portion of the frame to leave air openings, and means for holding said upholstery in place.

4. A device of the character described consisting of a suitable frame having seat and back portions, snubber means supported by said frame, flexible strips supported by said snubber means, upholstery arranged upon said flexile strips and extending to within a short distance of the front end of the seat portion and to within a short distance of the upper end of the back portion of the frame to leave air openings, and strips at the ends of the upholstery and adapted to be detachably connected to the seat and back portions for holding said upholstery in place.

5. A device of the character described consisting of a suitable frame having seat and back portions, snubber means supported by said frame, flexible strips supported by said snubber means, upholstery arranged upon said flexible strips and extending to within a short distance of the front end of the seat portion and to within a short distance of the upper end of the back portion of the frame to leave air openings, means for holding said upholstery in place, and flaps at the ends of the upholstery for closing the air openings.

In testimony whereof I affix my signature.

JOHN M. DORTON.